US008825796B2

(12) United States Patent
Kitamura (10) Patent No.: US 8,825,796 B2
(45) Date of Patent: Sep. 2, 2014

(54) TRANSACTION PROCESSING SYSTEM AND OPERATION OF THE TRANSACTION PROCESS SYSTEM (75) Inventor: Takashi Kitamura, Tokyo (JP)

(73) Assignee: The Bank of Tokyo-Mitsubishi UFJ, Ltd., Tokyo (JP)

( * ) Notice: Subject to any disclaimer, the term of this patent is extended or adjusted under 35 U.S.C. 154(b) by 421 days.

(21) Appl. No.: 13/237,463

(22) Filed: Sep. 20, 2011

(65) Prior Publication Data
US 2012/0239802 A1 Sep. 20, 2012

(30) Foreign Application Priority Data

Mar. 17, 2011 (JP) ................................. 2011-059567

(51) Int. Cl.
G06F 15/16 (2006.01)
G06F 7/04 (2006.01)
G06F 11/07 (2006.01)
G06F 11/30 (2006.01)

(52) U.S. Cl.
CPC ........ G06F 11/0709 (2013.01); G06F 11/0793 (2013.01); G06F 11/3006 (2013.01); G06F 11/0757 (2013.01); G06F 11/3089 (2013.01)
USPC .............................................. 709/217; 726/9

(58) Field of Classification Search
USPC .............................................. 726/9; 709/217
See application file for complete search history.

(56) References Cited

U.S. PATENT DOCUMENTS

| 2002/0112054 | A1 | 8/2002 | Hatanaka |
| 2010/0132024 | A1* | 5/2010 | Ben-Natan et al. ................ 726/9 |
| 2011/0134248 | A1* | 6/2011 | Heit et al. ..................... 348/161 |
| 2011/0214187 | A1* | 9/2011 | Wittenstein et al. ............. 726/25 |
| 2011/0296529 | A1* | 12/2011 | Bhanoo et al. ................... 726/26 |
| 2013/0030948 | A1* | 1/2013 | Fisher, Jr. ..................... 705/26.5 |

FOREIGN PATENT DOCUMENTS

| JP | H10-228406 A | 8/1998 |
| JP | 2001-249903 A | 9/2001 |
| JP | 2002-324047 A | 11/2002 |
| JP | 2008-186358 A | 8/2008 |
| JP | 2010-211616 A | 9/2010 |

OTHER PUBLICATIONS

Decision to grant a patent for JP2011-059567 issued on Jul. 2, 2013.

* cited by examiner

Primary Examiner — David Lazaro
Assistant Examiner — Mahran Abu Roumi
(74) Attorney, Agent, or Firm — Novak Druce Connolly Bove + Quigg LLP (57) ABSTRACT A transaction processing system includes an application server having a transaction processing unit, a process monitoring unit, a database server having a database, and a database management unit. The transaction processing unit sends a transaction identifier for identifying the transaction to the database management unit, requests a session process, and outputs the transaction identifier to the process monitoring unit. The process monitoring unit receives the transaction identifier, receives a session identifier for identifying the session process returned by the database management unit, and sends an instruction to terminate the session process to the database management unit after a certain period of time, and the database management unit creates the session identifier, correlates the session identifier with the transaction identifier which are stored, starts the session process, returns the correlated session identifier to the process monitoring unit when receiving the transaction identifier, and terminates the session process when receiving the instruction.

5 Claims, 6 Drawing Sheets

TRANSACTION PROCESSING SYSTEM AND OPERATION OF THE TRANSACTION PROCESS SYSTEM

CROSS REFERENCE TO RELATED. APPLICATION

This application is based upon and claims the benefit of priority from the prior Japanese Patent Application No. 2011-59567, filed on Mar. 17, 2011; the entire contents of which are incorporated herein by reference.

BACKGROUND OF THE INVENTION

Field of the Invention

The present invention is related to a process management system between a plurality of systems and in particular, is related to the management of process connections between an application server and a database server.

In recent years, a transaction process system which includes a plurality of servers is widely used in industries which require processing a large quantity of transactions such as the banking industry. This type of transaction system includes an application server and a database server. The application server performs transactions requested from a client. In addition, the database server includes a database which stores data which becomes the object of an operation requested by an application on the application server.

Operations in a conventional transaction processing system are as follows. The application server is arranged with web application server middle ware and software for example and runs an application. When a transaction request is received from a client, a query is requested to a database management system which operates on the database server in order to perform the query or data operation to the database server by a transaction process in the application. The database management system initiates a session process according to the query request, the query is made to the database by the session process, and the result of the request is obtained from the database. The database management system sends the result of the obtained query to the application server. The application server performs a transaction based on the result of the query and the result of the transaction is returned to the client.

When the database management system sends the result of a query to the application server, the database management system terminates the session process.

However, in the case where an error occurs in the system, for example, when the format of electronic text sent from the client as a transaction is incorrect or there is a defect in the database management system, the result of a query is not returned to the database server in the database management system and the session process can not be terminated.

In this case, the transaction process in the application is terminated by terminating a connection with the client or by a time out. Alternatively, because it is possible to discover a transaction with a problem in the application, a system manager can discover the transaction process and terminate it.

However, the session process of the database management system is not terminated and its status remains in progress even if the transaction process is terminated. In addition, it is difficult to discover a session process which processes a transaction with a problem in a conventional transaction processing system. That is, conventionally, because the session process on the database server side is not correlated with the transaction process and managed, a system manager cannot discover whether a query sent to the database corresponding to the transaction in the transaction process side was processed in any session process. Therefore, when a problem occurs, although it is possible to terminate a transaction process, it was difficult to terminate a corresponding session process which consumed resources while still in progress.

Consequently, an unnecessary session process remains in progress, and when such processes accumulate the resources of the database server are constrained and the performance of the database server becomes poor. In addition, even if an attempt is made to solve this poor performance, it is difficult to specify the session process which performs the query related to the transaction with the operation error. As a result, it becomes necessary to restart the database server, terminate the session process together with session processes which are unrelated to the operation error, online processing can not continue as a result and even transactions with no problems can not be conducted.

Thus, the present invention aims to provide a transaction processing system which can specify a session process on a database server associated with individual transactions in an application server.

BRIEF SUMMARY OF THE INVENTION

A transaction processing system related to one embodiment of the present invention includes an application server having a transaction processing unit which processes a transaction requested from a client, and a process monitoring unit which manages a session process generated in the database server according to the transaction process, and a database server having a database which stores data and a database management unit which manages the database, wherein the transaction processing unit sends a transaction identifier for identifying the transaction to the database management unit, requests a session process which operates the database according to the transaction process, and outputs the transaction identifier to the process monitoring unit, the process monitoring unit receives the transaction identifier from the transaction processing unit, receives a session identifier for identifying the session process which is returned by the database management unit according to an output of the transaction identifier to the database management unit, and sends an instruction to terminate the session process to the database management unit after a certain period of time elapses, and the database management unit creates the session identifier for identifying the session process when the transaction identifier is received from the transaction processing unit, correlates (the session identifier) with the transaction identifier and stores (the session identifier and the transaction identifier), starts the session process, returns the session identifier corresponding to the transaction identifier to the process monitoring unit when the transaction identifier is received from the process monitoring unit, and terminates the session process when an instruction to terminate the session process is received from the process monitoring unit.

A method of operating a transaction management system, the system including an application server and a database server, includes receiving a transaction request from a client by the application server, starting a transaction process by the application server, starting a monitoring process which stores a transaction identifier for identifying the transaction, and a notification of the start of the transaction process by the application server, sending a transaction identifier for identifying the transaction from the transaction process to a database server, and requesting a session process for operating a database corresponding to the transaction process by the application server, receiving the in transaction identifier by the database server, creating a session identifier for identifying the session process, correlating the session identifier with the transaction identifier and storing the session identifier with the transaction identifier by the database server, sending a session identifier corresponding to the transaction identifier to the monitoring process when the transaction identifier is received from the monitoring process, and initiating the session process by the database server, receiving the session identifier in the monitoring process by the application server, sending a session process result in the transaction process by the application server, sending the transaction process result based on the session process result in the transaction process to the client, and terminating the transaction process by the application server, sending an instruction for terminating the session process after a certain period of time is elapsed in the monitoring process to the database server by the application server, and terminating the session process when an instruction for terminating the session process in the database server is received by the application server.

EFFECTS OF THE INVENTION

According to the present invention, it is possible to specify and terminate a session process which includes an operation error, secure system resources, continue the operation of transactions which are unrelated to the operation error and maintain online processing.

DETAILED DESCRIPTION OF THE INVENTION

Figure 1:
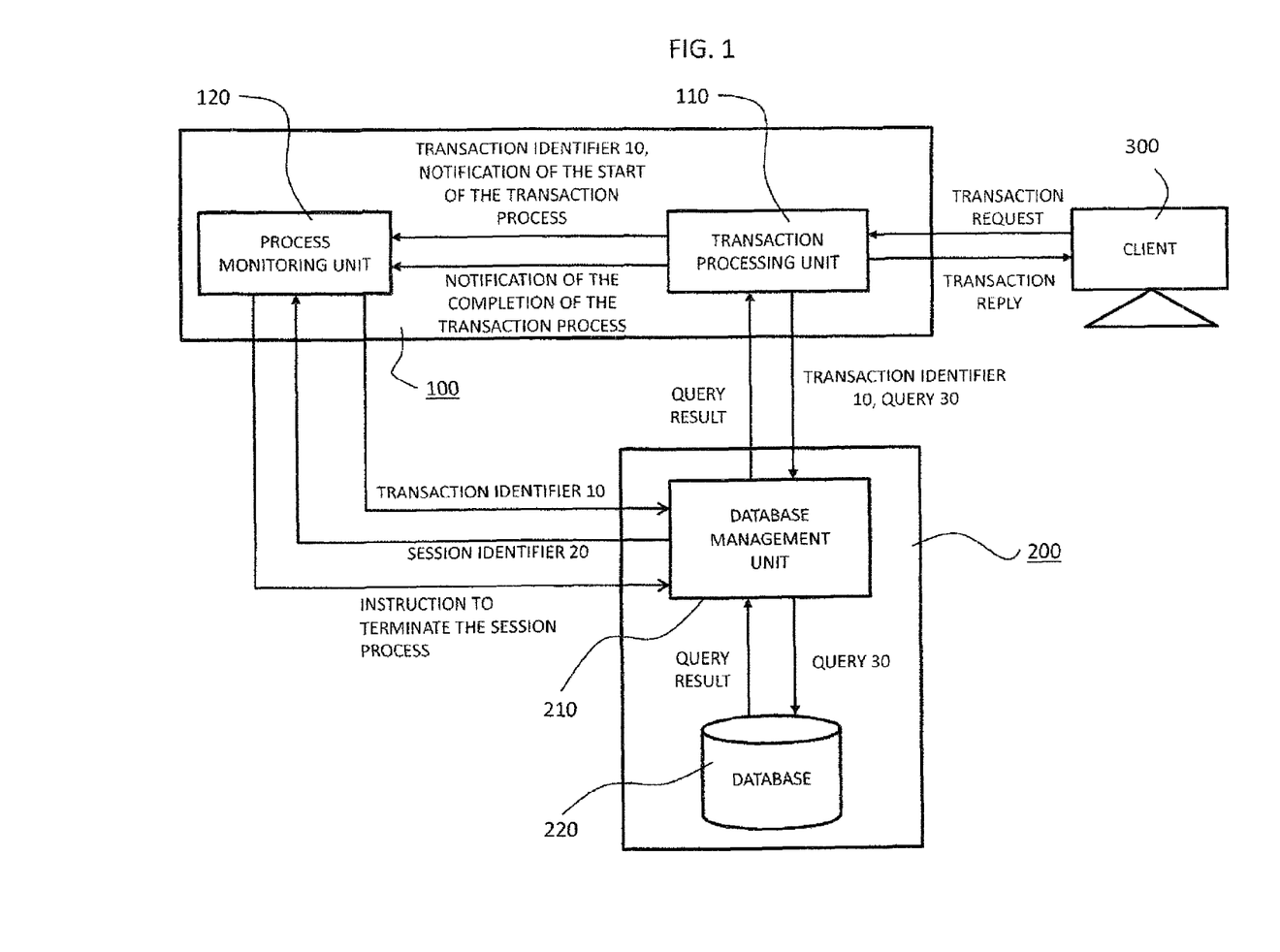
FIG. 1 is an approximate diagram of a transaction processing system related to one embodiment of the present invention.

FIG. 1 is an approximate diagram of a transaction processing system related to one embodiment of the present invention.

In FIG. 1, the transaction processing system related to one embodiment of the present invention includes an application server 100 and a database server 200. The application server 100 is connected with the application server 200 and a client 300 via a network.

The application server is, for example, a server computer which operates as a web application server. For example, the server computer operates middle ware (WAS; Web Application server) which operates the server computer as a web application server and the application server 100 is realized.

When a transaction request is sent to the application server 100 from the client 300, a transaction process begins by WAS on the application server 100. Furthermore, a web browser runs on the client 300 and the user of the client 300 operates the web browser thereby the transaction request may be sent to the application server 100. In addition, the request sent from the web browser is received by a web server (not shown in the diagram), a transaction request corresponding to the received request is generated and may be sent to the application server 100.

The application server 100 includes a transaction processing unit 110 and a process monitoring unit 120.

The transaction processing unit 110 receives a transaction request from the client 300. Furthermore, the transaction processing unit 110 may receive a transaction request from the client 300 via a web browser etc. A transaction request is an operation request to a database, for example, a request to search the database or a request to insert or update data. The transaction request includes expressions in SQL or equivalent language. The transaction request as an expression in SQL or equivalent language is called a "query" herein. The transaction processing unit 110 allocates transaction identifiers 10 unique to each transaction.

The transaction identifier 10 may be included in the transaction request, may be provided within the transaction processing unit 110 or a combination of both. In addition, the transaction identifier 10 may include a plurality of identifiers, for example, a combination of a client identifier for identifying the client 300 which sends the transaction request, and a sequential identifier provided in sequence to the transaction received by the transaction processing unit. In the case where a plurality of browsers runs in the client 300, the transaction identifier 10 may include a browser identifier within the client 300.

In order for the transaction processing unit 110 to perform a process according to the transaction request received from the client 300, the transaction identifier 10 and a query 30 are sent to a database management unit 210 included in the database server 200, and a session process is requested for performing the query 30.

In addition, the transaction processing unit 110 outputs the transaction identifier 10 to the process monitoring unit 120 when the session process is requested. For example, after a session process is generated by the database management unit 210, the transaction processing unit 110 outputs the transaction identifier 10 to the process monitoring unit 120. In this way, the transaction processing unit 110 can notify the start of the session process corresponding to the transaction identifier 10 to the process monitoring unit 110.

The transaction processing unit 110 receives a query result from the database management unit 210 and performs a transaction process using the query result.

When the transaction process is completed, the transaction processing unit 110 sends a transaction reply to the client 300 which sent the transaction request based on the transaction process result.

In addition, the transaction processing unit 110 sends a notification of the completion of the transaction process to the process monitoring unit 120 and terminates the process When the transaction identifier 10 is received from the transaction processing unit 110 the process monitoring unit 120 sends the transaction identifier 10 to the database management unit 210 and requests that a session identifier 20 which identifies a session process corresponding to the transaction identifier 10 be sent to the process monitoring unit 120.

The process monitoring unit 120 receives the session identifier 20 is sent from the database management unit 210, correlates the received session identifier 20 with the transaction identifier 10 and stores them. In this way, monitoring of the session process can begin.

When a notification of the completion of a transaction process from the transaction processing unit 110 is received, the process monitoring unit 120 extracts the transaction identifier 10 included in the notification of the completion of the transaction process, refers to the session identifier 20 correlated with the transaction identifier 10 and terminates monitoring of the session process corresponding to the session identifier 20. In addition, the process monitoring 120 may also terminate monitoring of the transaction.

In the case where the process monitoring unit 120 receives the transaction identifier 10, and after the being notified that a session process has started does not receive a notification that the transaction process corresponding to the transaction identifier 10 is completed by the end of a certain period of time elapsing, the process monitoring unit 120 refers to the session identifier 20 corresponding to the transaction identifier 10, and sends an instruction for terminating the session process identified by the session identifier 20 to the database management unit 210.

Alternatively, the process monitoring unit 120 begins a monitoring process every certain period of time, and may operate so that at this time a session process which operates for a period of time which exceeds a threshold period of time is terminated. For example, the process monitoring unit 120 starts a monitoring process every 30 minutes and the monitoring process confirms the operation start time of the session process. In the case where a threshold value is set at 20 minutes, the process monitoring unit 120 judges that a session process which has operated for 20 minutes from the operating start time should be terminated and sends an instruction to terminate the session process to the database management unit 210.

In addition, the process monitoring unit 120 may set a different threshold time period according to the type of transaction. For example, the threshold may be set lower in the case where a transaction does not change with a variation in data or when the variation in data is small, and terminate a process after a shorter period of time has elapsed. Specifically, a threshold value may be set lower in order to terminate a session process related to a transaction such as an online banking balance inquiry which is set with a higher priority than a session process related to a transaction such as a transfer operation coupled with a variation in data of the amount of money. In addition, a different threshold level may be set between sessions related to transfer operation transactions depending on the level of the amount of money.

In addition, the process monitoring unit 120 may set a different threshold value according to the attribute of a user of a client 300 which requests a transaction, and may set a threshold value according to the number of session processes in operation.

The database server 200 includes a database 220 and a database management unit 210.

The database management unit 210 is a database management system (DBMS). The database management unit 210, in particular, may also be a related database management system (RDBMS). The database management unit 210 executes operations to the database via a session process.

The database management unit 210 receives a transaction identifier 10 and queries to the database from the transaction processing unit 110 as session process execution requests.

When a session process execution request which includes the transaction identifier 10 and a query is received the database management unit 210 begins a session process and issues a session identifier 20 which identifies a session process. The session identifier 20 is a unique identifier corresponding to each session process and is used in the database management unit 210 for managing a session process.

The database management unit 210 correlates and stores the transaction identifier 10 and the session identifier 20, and performs session management. Storage may be performed for example in a session table.

In addition, when a session identifier sent from the process monitoring unit 120 is received, the database management unit 210 determines a session identifier corresponding to the transaction identifier 10, replies to the query, and sends the session identifier to the process monitoring unit 120.

The database management unit 210 receives a termination instruction from the process monitoring unit 120 and terminates the session process.

Figure 2:
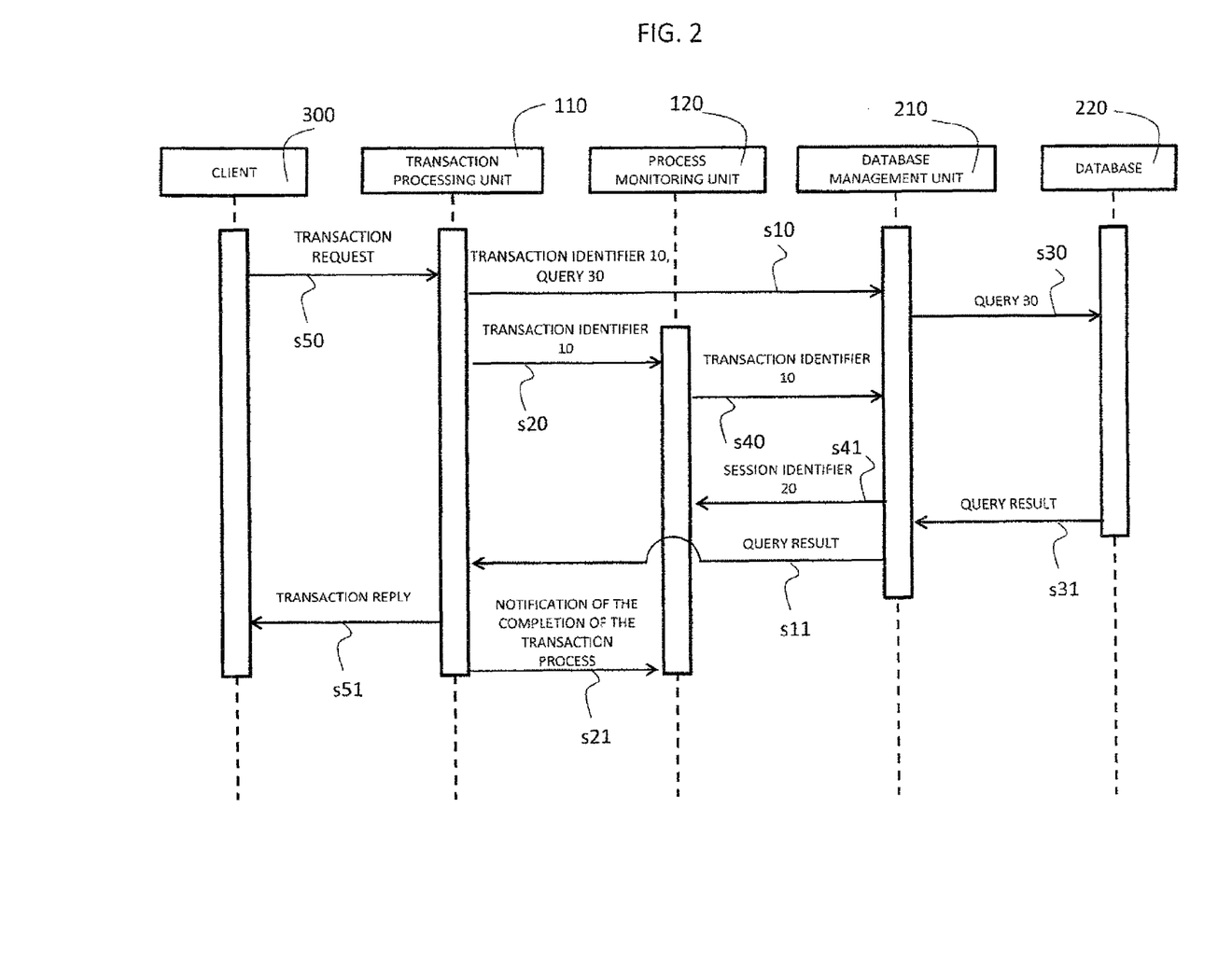
FIG. 2 is a sequence diagram of data during normal operation in the transaction processing system related to one embodiment of the present invention.

FIG. 2 is a sequence diagram which explains the flow of data in the case where a transaction process is complete normally in the transaction processing system related to one embodiment of the present invention explained in FIG. 1.

Referring to FIG. 2, first, a transaction request is sent to the transaction processing unit 110 from the client 300 (s50).

The transaction processing unit 110 sends a transaction identifier 10 and a query to the database management unit 210 (s10). The database management unit 210 starts a session process and makes a query to the database (s30).

The transaction processing unit 110 sends a transaction identifier 10 to the processing monitoring unit 120 (s20). The process monitoring unit 120 sends the transaction identifier 10 to the database management unit 210 (s40), and a session identifier 20 is received from the database management unit 210 (s41).

When a query is received from the database management unit 210 the database 220 sends a query result corresponding to the query to the database management unit 210 (s31). The database management unit 210 correlates the query result with the transaction identifier 10 and sends the query result to the transaction processing unit 110 (s11).

When the query result is received the transaction processing unit 110 performs a transaction process according to the query result and sends a transaction replay to the client 300 (s51). A completion notification is sent to the process monitoring unit 120 (s21) after sending the transaction reply and the series of processes are complete.

Figure 3:
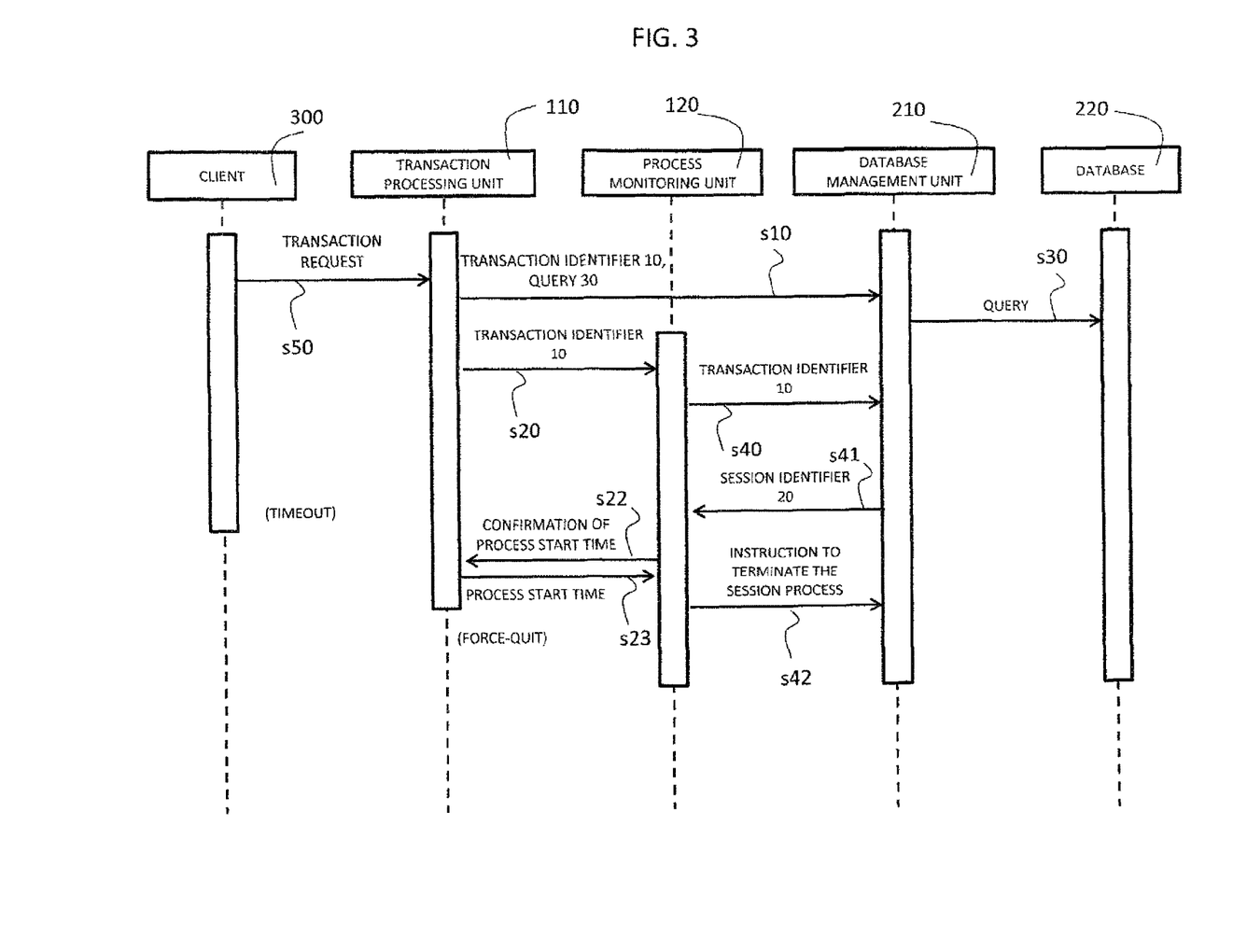
FIG. 3 is a sequence diagram of data when an error occurs in the transaction processing system related to one embodiment of the present invention.

FIG. 3 is a sequence diagram which explains the flow of data in the case where a session process is forcibly terminated in the transaction processing system related to one embodiment of the present invention explained in FIG. 1.

Referring to FIG. 3, first, a transaction request is sent to the transaction processing unit 110 from the client 300 (s50).

The transaction processing unit 110 sends a transaction identifier 10 and a query to the database management unit 210 (s10). The database management unit starts a session process and makes a query to the database 220 (s30).

The transaction processing unit 110 sends the transaction identifier 10 to the process monitoring unit 120 (s20). The process monitoring unit 120 sends the transaction identifier 10 to the database management unit 210 (s40) and a session identifier 20 is received from the database management unit 210 (s41).

Following this, when a certain period of time elapses and there is no reply to the database management unit 210 in response to a query from the database 220 and a query result is not sent to the transaction processing unit 110 from the database management unit 210, the process monitoring unit 120 confirms with the transaction processing unit 110 the process start time of a transaction corresponding to the transaction identifier 10 (s22), and the transaction processing unit 110 returns the process start time to the process monitoring unit 120 (s23).

As a result of the confirmation to the transaction processing unit 110, if a certain period of a time has elapsed since the process start time, the process monitoring unit 120 sends a termination instruction to the database management unit 210 (s42).

Furthermore, the process monitoring unit 120 can set the time the transaction identifier 10 is received from the transaction processing unit 120 as the process start time. In this case, it is not necessary for the process monitoring unit 120 to confirm the process start time of a transaction corresponding to the transaction identifier 10 with the transaction processing unit 110.

The database management unit 210 which received the termination instruction terminates the session process.

Furthermore, the processing of a transaction corresponding to the transaction identifier 10 in the transaction processing unit 110 is forcibly terminated. In addition, processes in the client 300 are terminated by being timed out due to no reply within a certain period of time for example.

Figure 4:
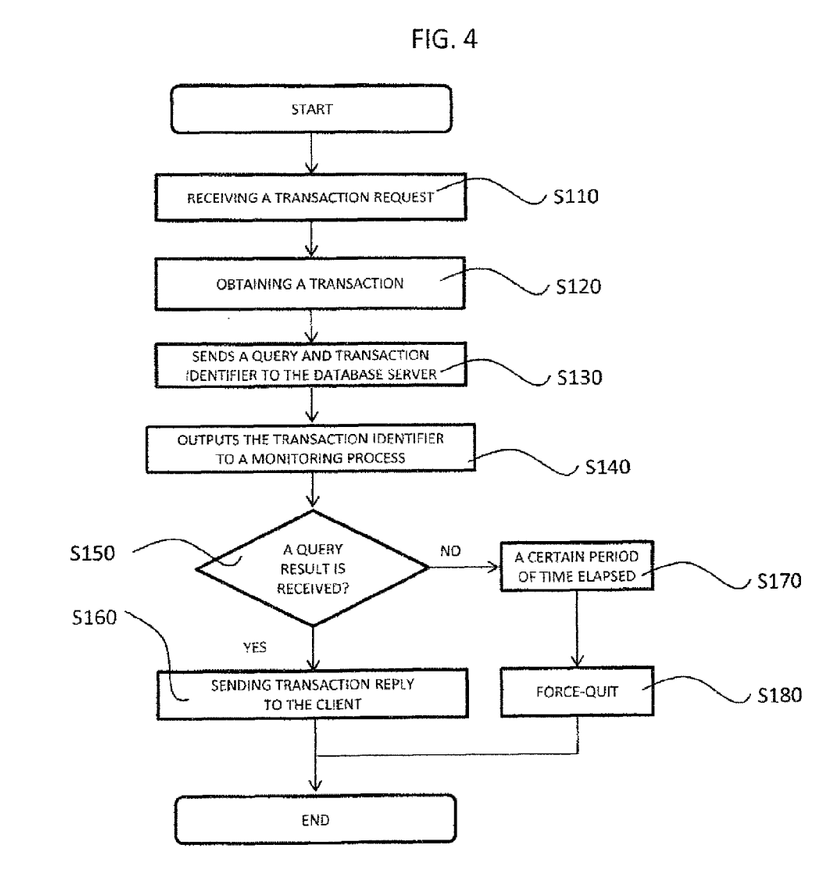
FIG. 4 is a flowchart of the processes in a transaction processing unit of the transaction processing system related to one embodiment of the present invention.

FIG. 4 is a flowchart which shows an outline of the processes in the transaction processing unit 110.

Referring to FIG. 4, first, the transaction processing unit 110 receives a transaction request from the client 300 which requests a transaction process (S110).

The transaction processing unit 110 which receives the transaction request obtains a transaction identifier 10 (S120). That is, as stated above, either the transaction identifier 10 included in the transaction request is extracted or transaction identifiers 10 are allocated for each transaction request in the transaction processing unit 110, and a transaction identifier 10 unique to each transaction is obtained in the transaction processing unit 110.

In order to perform a transaction process according to a transaction request, the transaction processing unit 110 sends a query and transaction identifier 10 to the database server 200, more specifically, the database management unit 210, and requests a session process (S130).

The transaction processing unit 110 outputs the transaction identifier (S140) to a monitoring process which monitors a session process in the process monitoring unit 120, that is, the database server 200 (S140).

The transaction processing unit 110 confirms whether a query result is received for the query sent to the database server 200 (S150).

In the case where a query result is received, the transaction processing unit 110 performs a transaction process based on the query result and sends a transaction reply to the client 300 according to the transaction process result (S160). After sending a transaction reply, a process completion is sent to the process monitoring unit 120 and the process is terminated.

In the case where a query result is not received and a certain period of time has elapsed (S170), the transaction is terminated without waiting for the reception of the query result (S180). For example, a process for processing the transaction is forcibly terminated.

Figure 5:
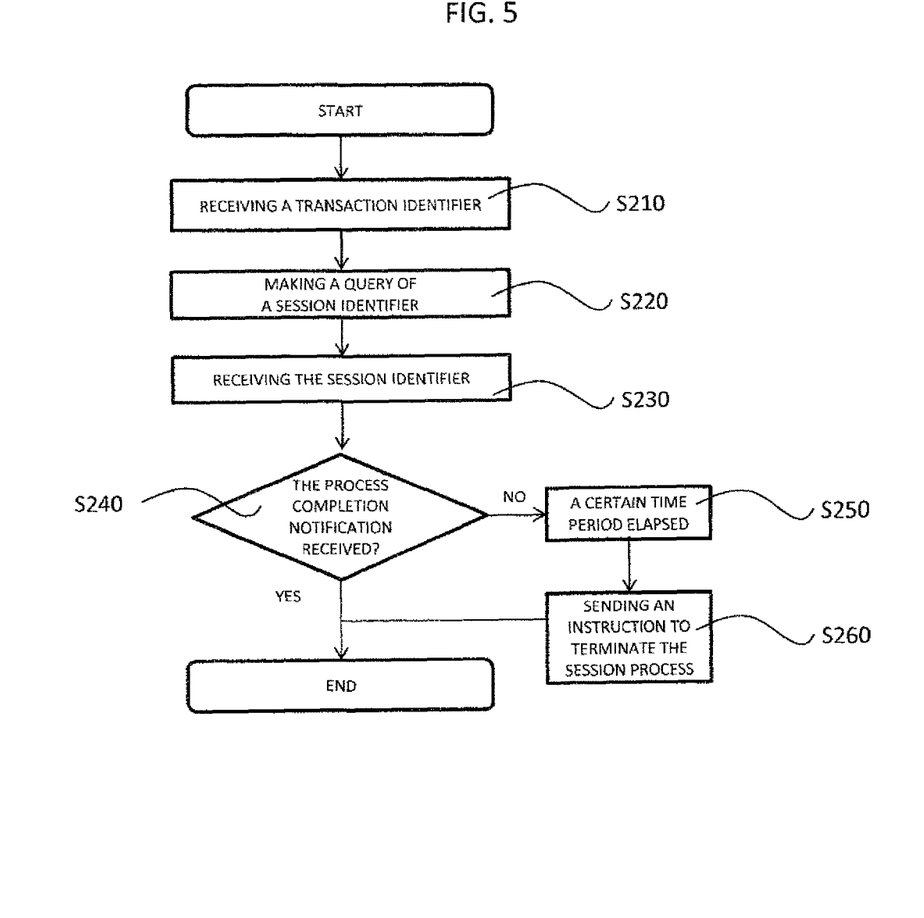
FIG. 5 is a flowchart of the processes in a process monitoring unit of the transaction processing system related to one embodiment of the present invention.

FIG. 5 is a flowchart which shows an outline of the processes in the process monitoring unit 120.

Referring to FIG. 5, first, the process monitoring unit 120 receives a notification of the start of a transaction process from the transaction processing unit 110 together with a transaction identifier 10 (S210).

The process monitoring unit 120 which receives the transaction identifier 10 makes a query of a session identifier 20 to the database management unit 210 of the database server 200 (S220). In this way, the process monitoring unit 120 can determine a session process corresponding to a transaction related to the transaction identifier 10.

A session identifier 20 is sent from the database server 200 according to the query in S220. As a result, the process monitoring unit 120 receives the session identifier 20 (S230). When the session identifier 20 is received, the process monitoring unit 120 begins monitoring a session process corresponding to the session identifier 20.

When the transaction process is completed, the transaction processing unit 110 sends a process completion notification to the process monitoring unit 120. The process monitoring unit 120 waits for the notification (S240). When the process completion notification is received, monitoring of the session process corresponding to the transaction is terminated.

If the process completion notification is not received and a certain time period has elapsed (S250), the process monitoring unit 120 sends a session identifier 20 and an instruction to terminate the session process to the database management unit 210 in order to terminate the session process corresponding to the transaction (S260).

In this way, in the database management unit 210, in the case where a session process remains without being terminated due to an error in any transaction process, it is possible to terminate the session process by an elapse of a certain period of time and avoid unnecessary load on the database server. In addition, because the session process and transaction are correlated by the session identifier 20 and the transaction identifier 10, it is possible to terminate just the session process corresponding to the transaction, and manage the system without terminating other session processes thereby it is possible to provide a system with a greater level of reliability.

Figure 6:
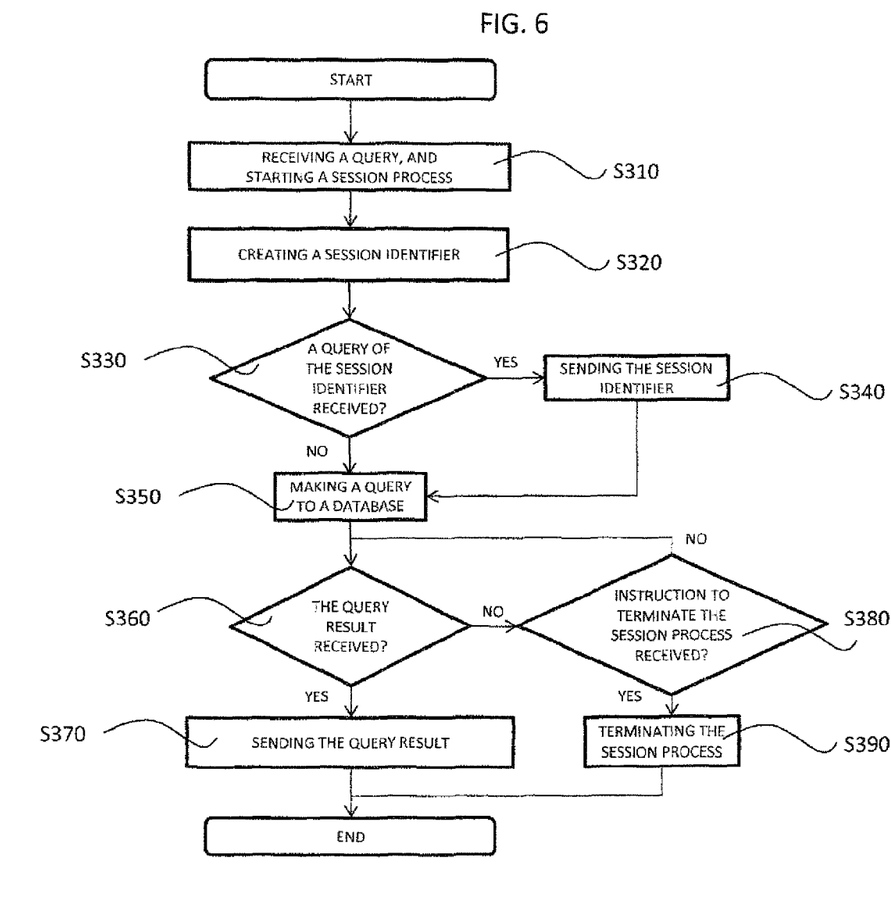
FIG. 6 is a flowchart of the processes in a database management unit of the transaction processing system related to one embodiment of the present invention.

FIG. 6 is a flowchart which shows an outline of the processes in the database management unit 210.

Referring to FIG. 6, first, the database management unit 210 receives a request to perform a session process from the transaction processing unit 110 (S310). The session process request includes a transaction identifier 10 and a query. The session process request is received and the database management unit 210 starts the session process.

Next, the database management unit 210 creates a session identifier 20 at the same time as starting a session process (S320). The session identifier 20 which is created is correlated with the transaction identifier 10 and stored in a session table of the database management unit 210.

When a query is made by the process monitoring unit 120 of the session identifier 20 corresponding to the transaction identifier 10 (S330), the database management unit 210 sends the session identifier 20 corresponding to the transaction identifier 10 to the process monitoring unit 120 (S340).

The database management unit 210 makes a query to the database 220 according to the query in the session process request sent from the transaction processing unit 110 (S350).

When a query result is received from the database 220 (S360), the database management unit 210 sends the query result to the transaction processing unit 110 (S370) and terminates the session process.

In the case where a termination instruction is received with the session identifier 20 from the process monitoring unit 120 (S380) before the database management unit 210 receives the query result from the database 220 (S360), so the session process corresponding to the session identifier is terminated according to a termination instruction (S390). In this way, the session is terminated and the processes are completed.

What is claimed is:

1. A transaction processing system comprising:
an application server comprising at least one processor of the transaction processing system, configured to implement a transaction processing to process a transaction requested from a client, and a process monitoring to manage a session process performed at a database server based on the transaction; and
a database server comprising a database which stores data, and a database management unit which manages the database;
wherein
the transaction processing comprises:
sending a transaction identifier for identifying the transaction to the database management unit,
requesting the session process to be performed at the database management unit, and
outputting the transaction identifier to the process monitoring;
the process monitoring comprises:
receiving the transaction identifier,
receiving from the database management unit a session identifier for identifying the session process, wherein the session identifier is generated by the database management unit based at least in part on the transaction identifier, and
sending an instruction to terminate the session process to the database management unit after a certain period of time elapses; and
the database management unit is configured to create the session identifier for identifying the session process when the transaction identifier is received from the application server, to correlate the session identifier with the transaction identifier, to store the session identifier and the transaction identifier, to start performing the session process, to return the session identifier corresponding to the transaction identifier to the process monitoring when the transaction identifier is received from the process monitoring, and to terminate the session process when an instruction to terminate the session process is received.

2. The transaction processing system according to claim 1, wherein the process monitoring further comprise starting a timer for detecting the certain period of time elapsed when the transaction identifier is received from the transaction processing.

3. The transaction processing system according to claim 2, wherein the transaction processing further comprises outputting a termination notice of the transaction process to the process monitoring, and the process monitoring further comprises stopping the timer when the termination notice of the transaction process is received from the transaction processing.

4. An application server comprising:
at least one processor of the application server, configured to implement;
a transaction processing to process a transaction requested from a client; and
a process monitoring to manage a session process performed at a database server based on the transaction; wherein
the transaction processing comprising;
sending a transaction identifier for identifying the transaction to the database server,
requesting the session process to be performed at the database management unit, and
outputting the transaction identifier to the process monitoring; and
the monitoring process comprises:
receiving the transaction identifier,
receiving from the database management unit a session identifier for identifying the session process, wherein the session identifier generated by the database management unit based at least in part on the transaction identifier, and
sending an instruction to terminate the session process to the database server after a certain period of time elapses.

5. A method of operating a transaction management system, the system including an application server and a database server, comprising:
receiving, at the application server, a transaction request from a client;
starting, at the application server, a transaction process;
starting, at the application server, a monitoring process which stores a transaction identifier for identifying the transaction, and a notification of the start of the transaction process;
sending, at the application server, a transaction identifier for identifying the transaction from the transaction process to a database server;
requesting, at the application server, a session process for operating a database corresponding to the transaction process;
receiving, at the database server, the transaction identifier;
creating, at the database server, a session identifier for identifying the session process;
correlating, at the database server, the session identifier with the transaction identifier;
storing, at the database server, the session identifier with the transaction identifier;
sending, at the database server, a session identifier corresponding to the transaction identifier to the monitoring process when the transaction identifier is received from the monitoring process;
initiating, at the database server, the session process;
receiving, at the application server, the session identifier in the monitoring process;
sending, at the application server, a session process result in the transaction process;
sending, at the application server, the transaction process result based on the session process result in the transaction process to the client;
terminating, at the application server, the transaction process;
sending, at the application server, an instruction for terminating the session process after a certain period of time is elapsed in the monitoring process to the database server; and
terminating, at the application server, the session process when an instruction for terminating the session process in the database server is received.

* * * * *